United States Patent [19]

Occelli

[11] Patent Number: 5,174,890
[45] Date of Patent: Dec. 29, 1992

[54] CATALYTIC CRACKING USING A METALS SCAVENGING COMPOSITION

[75] Inventor: Mario L. Occelli, Yorba Linda, Calif.

[73] Assignee: Union Oil Company of California, Los Angeles, Calif.

[21] Appl. No.: 387,540

[22] Filed: Jul. 31, 1989

[51] Int. Cl.⁵ .................. C10G 11/02; C10G 11/05
[52] U.S. Cl. .................. 208/120; 208/52 CT; 208/118
[58] Field of Search .............. 208/52 CT, 118, 120, 208/120 MC; 502/73, 84, 251

[56] References Cited

U.S. PATENT DOCUMENTS

| | | | |
|---|---|---|---|
| 3,992,467 | 11/1976 | Stridde | 260/671 P |
| 4,137,151 | 1/1979 | Csicsery | 208/120 |
| 4,152,250 | 5/1979 | Inooka et al. | 208/251 |
| 4,266,672 | 5/1981 | Van Nordstrand | 208/120 |
| 4,268,376 | 5/1981 | Foster | 208/52 CT |
| 4,280,898 | 7/1981 | Tatterson et al. | 208/119 |
| 4,309,276 | 1/1982 | Miller | 208/118 |
| 4,311,581 | 1/1992 | Baron et al. | 208/115 |
| 4,341,661 | 7/1982 | Baron et al. | 502/73 |
| 4,381,991 | 5/1983 | Bertolacini et al. | 208/120 MC |
| 4,465,588 | 8/1984 | Occelli et al. | 208/52 CT |
| 4,465,779 | 8/1984 | Occelli et al. | 520/63 |
| 4,497,902 | 2/1985 | Bertolacini et al. | 502/65 |
| 4,519,897 | 5/1985 | De Jong | 208/74 |
| 4,582,595 | 4/1986 | Audeh et al. | 208/216 |
| 4,686,204 | 8/1987 | Mester et al. | 502/407 |
| 4,750,987 | 6/1988 | Beck et al. | 208/113 |
| 4,775,461 | 10/1988 | Harris et al. | 502/84 |
| 4,781,816 | 11/1988 | Lee et al. | 208/52 CT |
| 4,839,026 | 6/1989 | Brown et al. | 208/120 |
| 4,840,724 | 6/1989 | Groenenboom et al. | 208/120 |
| 4,921,824 | 4/1990 | Chin et al. | 502/73 |
| 4,952,544 | 8/1990 | McCanley | 502/73 |

OTHER PUBLICATIONS

M. L. Occelli, "Cracking Metal-Contaminated Oils with Catalysts Containing Metal Scavengers," *Fluid Catalytic Cracking*, ACS Symposium Series 375, M. L. Occelli, Editor, 1988, pp. 162-181.

M. L. Occelli and J. M. Stencel, "Characerization of Dual-Function Cracking Catalyst Mixtures," *Fluid Catalytic Cracking*, ACS Symposium Series 375, M. L. Occelli, Editor, 1988, pp. 195-214.

*Primary Examiner*—Helane Myers
*Attorney, Agent, or Firm*—Yale S. Finkle; Gregory F. Wirzbicki

[57] ABSTRACT

A metals scavenging composition comprising a rare earth component and a layered magnesium silicate, such as sepiolite or attapulgite, is mixed with separate particles of a cracking catalyst and the mixture used to crack hydrocarbon feedstocks containing relatively high concentrations of vanadium and other contaminant metals. The use of the metals scavenger prolongs the life of the catalyst while maintaining (1) relatively high conversions and gasoline yields, and (2) relatively low hydrogen and coke makes.

28 Claims, No Drawings

CATALYTIC CRACKING USING A METALS SCAVENGING COMPOSITION

BACKGROUND OF THE INVENTION

This invention relates to a catalytic cracking process and is particularly concerned with converting high molecular weight hydrocarbon feedstocks that contain substantial quantities of vanadium and other metal contaminants to lower molecular weight products utilizing separate particles of a metals scavenging composition in combination with the cracking catalyst.

Fluidized catalytic cracking (FCC) units are used in the petroleum industry to convert high boiling hydrocarbon feedstocks to more valuable hydrocarbon products, such as gasoline, having a lower average molecular weight and a lower average boiling point than the feedstocks from which they were derived. The conversion is normally accomplished by contacting the hydrocarbon feedstock with a moving bed of catalyst particles at temperatures ranging between about 800° F. and about 1100° F. The most typical hydrocarbon feedstock treated in FCC units comprises a heavy gas oil, but on occasions such feedstocks as light gas oils, naphthas, reduced crudes and even whole crudes are subjected to catalytic cracking to yield lower boiling hydrocarbon products.

Catalytic cracking in FCC units is generally accomplished by a cyclic process involving separate zones for catalytic reaction, steam stripping, and catalyst regeneration. The hydrocarbon feedstock is blended with an appropriate amount of catalyst particles to form a mixture that is then passed to a catalytic reactor, normally referred to as a riser, wherein the mixture is subjected to a temperature between about 800° F. and about 1100° F., normally between about 900° F. and 1050° F., in order to convert the feedstock into gaseous, lower boiling hydrocarbons. After these lower boiling hydrocarbons are separated from the catalyst in a suitable separator, such as a cyclone separator, the catalyst, now deactivated by coke deposited upon its surfaces, is passed to a stripper. Here the deactivated catalyst is contacted with steam to remove entrained hydrocarbons that are then combined with the vapors exiting the cyclone separator to form a mixture that is subsequently passed downstream to other facilities for further treatment. The coke-containing catalyst particles recovered from the stripper are introduced into a regenerator, normally a fluidized bed regenerator, where the catalyst is reactivated by combusting the coke in the presence of an oxygen-containing gas, such as air, at a temperature which normally ranges between about 1000° F. and 1500° F. The cyclic process is then completed by blending the reactivated catalyst particles with the feedstock entering the riser of the FCC unit.

There has recently been a strong trend in the petroleum industry toward the use of higher molecular weight hydrocarbons, e.g., residual oils, as feeds to FCC units. A common problem arising from the use of such feedstocks is that they normally contain relatively high concentrations of metals, such as nickel, vanadium, iron and copper, which tend to deposit on the catalyst during cracking operations, thereby gradually reducing its activity and selectivity. These metals are normally present in the form of organometallic compounds, such as porphyrins and asphaltenes (where the metals are coordinated to heteroatom elements). Some of the metal contaminants which deposit on the catalyst, such as nickel constituents, deleteriously affect selectivity by increasing the production of hydrogen, light gases and coke. Other metal contaminants, such as vanadium, decrease activity by destroying the zeolite portion of the catalyst. According to U.S. Pat. Nos. 4,432,890 and 4,485,184, the disclosures of which are hereby incorporated by reference in their entireties, vanadium is especially detrimental to catalyst life. These patents teach that, as the vanadium oxide level on the catalyst increases, the high temperatures encountered in the catalyst regenerator cause vanadium pentoxide ($V_2O_5$) to melt and begin to flow. The resultant liquid vanadium pentoxide enters the zeolite structure, irreversibly destroying the structure of the zeolite so as to form a less active amorphous material. The melting and the flowing of the vanadium pentoxide can, in some cases, also cause coalescence among catalyst particles which adversely affects fluidization properties.

Accordingly, it is an object of the present invention to provide a fluid catalytic cracking process for treating feedstocks that contain relatively high concentrations of vanadium and other metals while maintaining the activity and selectivity of the catalyst at useful levels. It is another object of the invention to provide a metals scavenging composition for use in such a fluid catalytic cracking process. These and other objects of the invention will become more apparent in view of the following description of the invention.

SUMMARY OF THE INVENTION

In accordance with the invention, it has now been found that the deleterious effects of vanadium and other metal constituents on the activity and selectivity of a catalytic cracking catalyst comprising a molecular sieve having cracking activity dispersed in a matrix or binder can be substantially avoided by mixing the catalyst with separate particles of a metals scavenger that preferentially sorbs the vanadium and other metal constituents. The metals scavenger comprises a rare earth component and a layered magnesium silicate. The rare earth component is normally supported on the layered magnesium silicate and can be a rare earth metal component, such as a cerium or a lanthanum component, or a mixture of rare earth components, such as the rare earth ores known as bastnaesite and monazite. The layered magnesium silicate is normally selected from the group consisting of sepiolite, attapulgite, saponite, chrysotile and hectorite with sepiolite being preferred. It has been found that hydrocarbon feedstocks containing substantial concentrations of vanadium, nickel and other contaminant metals can be effectively subjected to catalytic cracking in an FCC unit without prior treatment to reduce the concentration of metal contaminants by replacing between about 5 and about 60 weight percent of the normal catalyst inventory with the metals scavenger of the invention.

In general, the use of the metals scavenging composition of the invention along with the cracking catalyst will allow the catalyst to be effective even though the mixture of catalyst and scavenger may accumulate a relatively high concentration of metal contaminants, e.g., a concentration of vanadium exceeding about 10,000 ppmw, calculated as the metal, when the mixture is used to crack feedstocks containing a relatively high metals concentration, e.g., greater than 1.0 ppmw vanadium, normally greater than 5.0 ppmw vanadium, calculated as the metal. Such feedstocks are typically unhydrotreated oils containing more than about 70 weight percent components boiling above about 650° F.

DETAILED DESCRIPTION OF THE INVENTION

In accordance with the invention, a fluidized catalytic cracking (FCC) process or other cyclic catalytic cracking process, in which a hydrocarbon feedstock containing metal constituents is refined to produce low-boiling hydrocarbon products by passing the feedstock in contact with a cracking catalyst through a catalytic cracking reaction zone in the substantial absence of added molecular hydrogen, is improved by introducing a metals sorbent or scavenging composition into the cyclic process to preferentially sorb metal contaminants and thereby prevent them from deactivating the cracking catalyst. In general, any molecular sieve possessing cracking activity at temperatures above 750° F. may be used as the acidic component of the cracking catalyst. The term "molecular sieve" as used herein refers to any material capable of separating atoms or molecules based on their respective dimensions. The molecular sieve component of the catalyst can be nonzeolitic or zeolitic. The term "nonzeolitic" as used herein refers to molecular sieves whose frameworks are not formed of substantially only silicon and aluminum in tetrahedral coordination with oxygen. The term "zeolitic" as used herein refers to molecular sieves whose frameworks are formed of substantially only silicon and aluminum in tetrahedral coordination with oxygen, such as the frameworks present in ZSM-5 type zeolites, Y zeolites and X zeolites. Examples of nonzeolitic crystalline molecular sieves which may serve as the active cracking component of the catalyst include silicoaluminophosphates, aluminophosphates, ferrosilicates, chromosilicates, borosilicates, pillared clays, delaminated clays and crystalline silicas such as silicalite. Examples of zeolitic crystalline molecular sieves which may be used as the active cracking component of the catalyst include Y zeolites, X zeolites, zeolite beta, zeolite L, zeolite omega, mordenite, and modifications of such zeolites.

The preferred molecular sieves for use in the cracking catalyst are Y zeolites and modified Y zeolites which possess cracking activity. U.S. Pat. No. 3,130,007, the disclosure of which is hereby incorporated by reference in its entirety, describes Y-type zeolites having framework silica-to-alumina mole ratios between 3.0 and 6.0 with a typical Y zeolite having a framework silica-to-alumina mole ratio of about 5.0.

The modified Y zeolites suitable for use as the cracking component of the catalyst are generally derived from Y zeolites by treatment which results in a significant modification of the Y zeolite framework structure, usually an increase in the framework silica-to-alumina mole ratio to a value typically above 6.0, and a reduction in unit cell size. It will be understood, however, that, in converting a Y zeolite starting material to a modified Y zeolite useful in the present invention, the resulting modified Y zeolite may not have exactly the same X-ray powder diffraction pattern for Y zeolites as is disclosed in U.S. Pat. No. 3,130,007. The d-spacings may be shifted somewhat due to a shrinkage in the unit cell size caused by an increase in the framework silica-to-alumina mole ratio. The essential crystal structure of the Y zeolite will, however, be retained so that the essential X-ray powder diffraction pattern of the modified zeolite used in the cracking catalyst will be consistent with that of either Y zeolite itself or a Y zeolite of reduced unit cell size. Examples of modified Y zeolites that can be used in the process of the invention include steam-stabilized Y zeolites and dealuminated Y zeolites Steam-stabilized Y zeolites are Y zeolites which have been hydrothermally treated to increase the framework silica-to-alumina mole ratio but not the overall silica-to-alumina mole ratio of the zeolite. Steam stabilization normally involves calcination of the ammonium or hydrogen form of the Y zeolite starting material at relatively high temperatures, typically above about 900° F., in the presence of steam. This treatment results in the expulsion of tetrahedral aluminum from framework into nonframework positions, but normally does not remove the aluminum from the zeolite and therefore does not increase the overall silica-to-alumina mole ratio of the starting Y zeolite.

The dealuminated Y zeolites that can be used as a component of the cracking catalyst are Y zeolites which have been chemically treated with acids, salts, or chelating agents to increase the overall silica-to-alumina mole ratio. A preferred group of dealuminated zeolites is prepared by dealuminating a Y zeolite having an overall silica-to-alumina mole ratio below about 6.0 and is described in detail in U.S. Pat. Nos. 4,503,023 and 4,711,720, the disclosures of which patents are hereby incorporated by reference in their entireties. A preferred member of this group of zeolites is known as LZ-210, a zeolitic aluminosilicate molecular sieve having the Y-type structure which is available from UOP (formerly the Linde Division of the Union Carbide Corporation).

The stability and/or acidity of the molecular sieves described above may be increased by exchanging the sieves with ammonium ions, polyvalent metal cations, such as rare earth-containing cations, magnesium cations or calcium cations, or a combination of ammonium ions and polyvalent metal cations, thereby lowering the sodium content until it is less than about 0.8 weight percent, preferably less than about 0.5 weight percent, and most preferably less than about 0.3 weight percent, calculated as $Na_2O$. Methods of carrying out the ion exchange are well known in the art.

The molecular sieve component of the catalyst is combined with a porous, inorganic refractory oxide matrix or binder to form the finished catalyst. The refractory oxide component in the finished catalyst, which component is typically amorphous, may be silica-alumina, silica, alumina, natural or synthetic clays, mixtures of one of more of these components and the like. Preferably, the inorganic refractory oxide matrix will comprise a mixture of a synthetic silica-alumina component and a clay component such as kaolin. The preferred finished catalyst will typically contain between about 5 weight percent and about 40 weight percent molecular sieve and greater than about 20 weight percent inorganic, refractory oxide. In general, the finished catalyst will contain between about 10 and about 35 weight percent molecular sieve, between about 30 and about 70 weight percent clay and between about 10 and about 30 weight percent of another inorganic, refractory oxide component.

The molecular sieve component of the cracking catalyst may be combined with the porous, inorganic refractory oxide component or a precursor thereof by techniques including mixing, mulling, blending or spray drying. Examples of precursors that may be used include alumina, alumina sols, silica sols, zirconia, alumina hydrogels and peptized alumina. In a preferred method of preparing the cracking catalyst, the molecular sieve is combined with an aluminosilicate gel or sol, a clay and/or other inorganic, refractory oxide component, and the resultant mixture is spray dried to produce finished catalyst particles normally ranging in diameter between about 40 and about 80 microns. If desired, however, the molecular sieve may be mulled or otherwise mixed with the refractory oxide component or precursor thereof, extruded and then ground into the desired particle size range. Normally, the finished catalyst will have an average bulk density between about 0.30 and about 0.90 gram per cubic centimeter and a pore volume between about 0.10 and about 0.90 cubic centimeter per gram.

Catalysts prepared as described above normally become poisoned and lose their useful cracking activity when the vanadium concentration on the catalyst in a FCC unit rises to above a value in the range between about 1000 ppmw and about 2500 ppmw, calculated as the metal. It has now been found that such deleterious effects on cracking catalysts can be substantially avoided by replacing a portion of the cracking catalyst inventory in the FCC unit with separate particles of a metals scavenging composition comprising a rare earth component and a layered magnesium silicate. It has been found that such solids tend to sorb vanadium and other metal constituents, which are present either in the feedstock or are transported in the gas phase from the catalyst, thereby tying-up the metal and preventing it from migrating to the catalyst where it can have deleterious effects on selectivity and/or activity. The use of such a metals scavenger maintains the activity and selectivity of the catalyst at a relatively high level even though the feedstock may be relatively rich in vanadium and other metal constituents.

The layered magnesium silicates which can be used as a component of the metal scavenging composition of the invention are naturally occurring or synthetic layered clays which are composed of platelets stacked one on top another to form aggregates in which alkali metal and alkaline earth metal cations are interposed between the platelets in order to balance charge deficiencies. Each platelet can be visualized as a sandwich with the two outer layers or planes composed primarily of chains containing silicon in tetrahedral coordination with oxygen atoms and the inner layer containing magnesium in octahedral coordination with oxygen atoms. The outer layers may contain elements in addition to silicon and oxygen, while the inner layer may contain elements in addition to magnesium and oxygen. The stacked arrangement of platelets normally has a repeating structure about every 9 Angstroms. Specific examples of layered magnesium silicates which can be used include hectorite and saponite, which are both smectite minerals, and sepiolite and attapulgite, which are known as palygorskite minerals. These families of minerals are described in detail along with the specifically mentioned species in the book entitled *Clay Mineralogy*, Second Edition, authored by Ralph E. Grimm and published by the McGraw Hill Book Company in 1968, the disclosure of which book is hereby incorporated by reference in its entirety. Another layered magnesium silicate which can be used in the metals scavenging composition of the invention is known as chrysotile, a mineral which is the source of serpentine asbestos.

Sepiolite is the preferred layered magnesium silicate for use in the scavenging composition of the invention. Although most forms of sepiolite contain only magnesium, silicon and oxygen, there are some known forms that contain small amounts of aluminum substituted for magnesium and/or silicon atoms. Such forms of sepiolite normally contain less than 5, typically less than 2, weight percent alumina and are more acidic than their aluminum-free counterparts. Sepiolite has a lath shape or fibrous morphology and is found in natural deposits around the world usually in the form of needles consolidated or bonded weakly in parallel orientation. A rationalization formula for sepiolite can be written as $H_6Mg_8Si_{12}O_{30}(OH)_{10}6H_2O$.

Attapulgite, which is in the same class of minerals as sepiolite, is somewhat similarly structured except that there is at least some substitution of aluminum atoms for either silicon or magnesium atoms. Hectorite and saponite, which are both smectite minerals, contain elements in addition to magnesium and silicon in their unit cell structures. Hectorite contains lithium which is substituted for a portion of the magnesium present whereas saponite contains aluminum substituted for a portion of the silicon present. Representative formulas for hectorite and saponite are, respectively, $Na_{0.66}[(OH)_4 \cdot Si_8(Mg_{5.34} \cdot Li_{0.66})O_{20}]$ and $Na_{0.66}[(OH)_4(Si_{7.34} \cdot Al_{0.66})Mg_6O_{20}]$ The rare earth component of the metals scavenging composition of the invention may contain any one or any combination of the lanthanide elements having atomic numbers between 57 and 71. These elements include lanthanum, cerium, praseodymium, neodymium, cerium, europium, gadolinium, terbium, dysprosium, holmium, erbium, thallium, ytterbium and lutetium. Normally, the metals scavenging composition will contain a mixture of rare earth metal constituents in a distribution similar to that of the rare earth ore from which the metals are derived. Such rare earth ores include bastnaesite, monazite, xenotine and the like.

The rare earth component or components may be incorporated into the layered magnesium silicate by deposition or impregnation. One method of incorporating the rare earth components into the layered magnesium silicate is to contact the particles with an aqueous solution containing multivalent cations of the rare earth element or elements to be incorporated. The solution may be sprayed onto the layered magnesium silicate particles or the particles may be slurried in the aqueous solution. After the magnesium silicate particles have been sprayed or slurried with the aqueous solution of rare earth components and dried, they are calcined at a temperature between about 550° F. and about 950° F. for between about 2 hours and about 10 hours to form the metals scavenging composition. The dried and calcined metals scavenger will normally contain between about 0.10 and about 30 weight percent rare earth components, calculated as the sum of the respective oxides, preferably between about 1.0 and about 10 weight percent. Preferably, the solution used as the source of rare earth components is a solution of rare earth chlorides which is lanthanum rich and contains, in addition to lanthanum, predominantly neodymium, cerium and praseodymium.

In lieu of using a solution containing the multivalent cations of rare earth elements to supply the rare earth component of the metals scavenging composition, the rare earth ores from which such solutions are normally derived may be used. As mentioned earlier, such ores include bastnaesite, monazite and xenotine. The use of these ores is quite advantageous from an economical point of view since solutions of rare earth metals that would otherwise be used are normally derived from these ores by expensive processing steps. Utilizing the ore itself eliminates these costs of processing and results in a more economical metals scavenging composition.

Of the rare earth ores that may be used, bastnaesite is generally preferred. It is a rare earth fluorocarbonate mineral usually found in nature in contact with zinc loads. Raw bastnaesite contains between about 65 and 80 weight percent of assorted rare earth elements, calculated as the sum of the respective rare earth oxides. Although bastnaesite contains praseodymium, neodymium, cerium, europium and gadolinium, it primarily contains lanthanum and cerium, usually in proportions exceeding 80 weight percent of the total rare earth content of the mineral. Although natural bastnaesite found in nature itself may be used in forming the scavenging composition of the invention, it will be understood that bastnaesite in a pretreated form, such as steamed, leached or calcined, may also be used. When natural bastnaesite is calcined in air at temperatures of about 700° C., the mineral undergoes a chemical reaction by which some of the rare earth fluorocarbonates therein are converted to rare earth oxyfluorides. Also, natural bastnaesite may be leached with hydrochloric acid to remove strontium and barium. Thus, it is within the scope of the invention to use bastnaesite in modified forms, and therefore, "bastnaesite" as used herein not only includes bastnaesite as found in nature but also any material having a distribution of rare earth elements to total rare earth elements substantially similar to bastnaesite. A typical chemical analysis of a natural or treated bastnaesite is set forth in U.S. Pat. No. 4,642,177, the disclosure of which is hereby incorporated by reference in its entirety.

When a rare earth ore like bastnaesite is used as the source of the rare earth components, the metals scavenging composition is typically prepared by mixing a powdered form of the ore with water and particles of the layered magnesium silicate to form a slurry which is spray dried to produce particles having a size similar to that of the cracking catalyst, i.e., between about 40 and about 80 microns. The concentration of the rare earth ore in the scavenger particles will normally range between about 5 and 60 weight percent, preferably between about 5 and 40 weight percent and most preferably between about 10 and 30 weight percent.

The scavenger particles, whether produced as described above or made by impregnating particles of the layered magnesium silicate with a solution of a rare earth component or components, will have a relatively high surface area, which ranges between about 50 and about 200 m$^2$/gm, preferably between about 80 and about 150 m$^2$/gm. The total pore volume of the particles is typically in the range between about 0.20 and about 0.9 cubic centimeter per gram, preferably between about 0.4 and about 0.7 cubic centimeter per gram. The amount of cracking catalyst and metals scavenger present in the FCC unit will be such that weight ratio of the cracking catalyst to the metals scavenger normally ranges between about 0.6 and about 20, preferably between about 1.0 and about 9.0.

When conventional cracking catalysts are used to process feedstocks which contain relatively high concentrations of metals such as nickel, vanadium, iron, copper and the like, such metals accumulate on the catalyst and tend to have many deleterious effects. For example, nickel, copper and iron tend to increase production of hydrogen, light gases and coke, thereby significantly lowering the yield of gasoline. The accumulation of these metals on the cracking catalyst can lead to a significant increase in volumes of unwanted gas and very quickly overload the gas compressors and gas recovery facilities associated with the catalytic cracking unit. Vanadium, on the other hand, tends to destroy the zeolitic component of the catalyst, thereby eliminating cracking activity.

It has been found that, when the metals scavenger of the invention as described above is used in combination with a conventional cracking catalyst in a FCC unit, the cracking catalyst becomes effective for cracking feedstocks containing relatively high concentrations of metals. Although the invention is not limited to any theory of operation, it is believed that the metals scavenger sorbs and ties-up metal constituents such as vanadium and nickel and prevents them from migrating to and poisoning the cracking catalyst. With respect to vanadium, it is believed that vanadium constituents are transferred in the gas phase from the feedstock or the catalyst to the metals scavenger where they react with magnesium and rare earth components to form rare earth orthovanadates and other compounds which are heat stable and therefore do not decompose at the high temperatures present in the FCC unit. The stability of these compounds prevents the vanadium from migrating back to the catalyst.

Conventional cracking catalysts are normally used to upgrade light and heavy gas oils in FCC units. Typically these gas oils contain relatively low concentrations of metals, i.e., less than 1.0 ppmw vanadium and 1.0 ppmw nickel. When such catalysts are used to crack feedstocks which contain these low concentrations of vanadium, the vanadium content of the equilibrium catalyst rarely rises above a value in the range between about 1000 ppmw and about 2500 ppmw, calculated as the metal. In general, conventional cracking catalysts begin to lose their useful cracking activity when the vanadium content of the catalyst rises to a value in this range. This frequently occurs, however, when the feedstock to the FCC unit contains greater than about 1.0 ppmw vanadium, calculated as the metal. The use of the metals scavenging composition of the invention in lieu of a portion of the conventional cracking catalyst in the FCC unit enables the cracking catalyst to remain effective when cracking feedstocks containing relatively high concentrations of vanadium and other metals. Thus, the process of the invention can typically be used to treat feedstocks containing concentrations of vanadium above 1.0 ppmw and remains effective for processing feedstocks which contain more than about 5.0 ppmw vanadium, calculated as the metal.

The use of separate particles of the metals scavenger, which preferentially sorbs and traps vanadium and other metals, allows the concentration of vanadium and other metals on the mixture of catalyst and scavenger to rise above levels which would normally yield deleterious results if a portion of the catalyst was not replaced with the scavenger. Typically, the mixture of a cracking catalyst and the metals scavenging composition of the invention results in an effective system for cracking high metals feedstocks even though the concentration of vanadium on the combination of catalyst particles and metals scavenger may exceed 10,000 ppmw, calculated as the metal. In general, the vanadium concentration on the combined mixture of catalyst particles and scavenger particles will range between about 5000 and about 20,000 ppmw, calculated as the metal.

Hydrocarbon feedstocks which contain vanadium will normally also contain other metals which may have a deleterious effect on the cracking process. These metals can include, among others, nickel, iron and copper. Normally, the feedstocks used in catalytic cracking will contain low concentrations of copper and iron, which originate primarily from corrosion and erosion of vessels and conduits. Thus, these metals are not considered to be significant catalyst contaminants. Because all metals do not have the same or equivalent deleterious effects on the cracking catalyst, the concentration of metals in the feedstock or on the catalyst is sometimes expressed in nickel equivalents instead of gross metals content. "Nickel equivalents" as used herein is equal to Ni(ppmw)+V/4 (ppmw)+Fe/7.1 (ppmw)+Cu/1.2 (ppmw). Feeds to typical FCC units will normally contain less than about 1.5 ppmw nickel equivalents, frequently less than about 0.25 ppmw. The use of the metals scavenging composition of the invention in lieu of a portion of the cracking catalyst allows the concentration of metals in the feedstock to be greater than about 4.0 ppmw nickel equivalents. The mixture of cracking catalyst and metals scavenger is especially effective for use when the metals content of the feed rises to above about 10 ppmw nickel equivalents, even above about 25 ppmw nickel equivalents. The mixture of catalyst particles and metal scavenger remains effective in cracking feedstock even though the metals level on the mixture exceeds about 5000 ppmw nickel equivalents expressed as metals on a regenerated equilibrium catalyst. In general, the mixture of catalyst and scavenger is effective when the metals content ranges between about 1000 ppmw and about 25,000 ppmw nickel equivalents, preferably between about 1500 ppmw and about 20,000 ppmw nickel equivalents, most preferably between about 2500 ppmw and about 15,000 ppmw nickel equivalents.

The hydrocarbon feedstocks that can be effectively processed using the mixture of cracking catalyst and metals scavenger described above will generally include feedstocks containing relatively high concentrations of metals, at least about 70 volume percent components which boil above 650° F., and greater than about 20 volume percent constituents boiling above about 1025° F. Such feedstocks typically contain heavy bottoms material such as tars, asphalts, asphaltenes and resins in which contaminant metals such nickel and vanadium tend to accumulate. Examples of suitable feedstocks for use in the process of the invention include whole crudes, nondeasphalted crude, residual oils, heavy gas oils boiling between about 650° F. and 1100° F., and atmospheric and vacuum distillation tower bottoms containing significant amounts of material boiling above 1150° F. Suitable feedstocks not only include petroleum derived fractions but also hydrocarbon oils derived from coal, shale, tar sands and similar hydrocarboncontaining solids. The feedstock may contain significant quantities, normally greater than about 0.5 weight percent, typically more than about 2.0 weight percent, and even greater than about 4.0 weight percent, asphaltenes and other pentane insoluble materials.

The metals scavenging composition of the invention has also been found to be effective as a sorbent for sulfur oxides. The effectiveness of the metals scavenger as a sulfur oxide sorbent is believed to be due to its relatively high magnesium content and open microstructure. Thus, when the scavenger is used in combination with a cracking catalyst in an FCC unit, the hydrocarbon feed may contain higher than normal quantities of organosulfur compounds. Normally, the feedstock may contain greater than about 0.3 weight percent sulfur, calculated as the element, typically between about 0.5 weight percent and about 5.0 weight percent. The affinity of the metals scavenger for removing sulfur oxides during the catalytic cracking process allows the scavenger to be used as an effective air pollution control agent. Because of the activity of the composition of the invention for sorbing sulfur oxides, it does not necessarily have to be used in cracking feedstocks which contain relatively high concentrations of metals. It can be effectively used on feedstocks which contain low concentrations of metals, i.e., individual concentrations of nickel and vanadium less than about 1.0 ppmw, usually less than 0.5 ppmw, calculated as the metal. Also, even though the rare earth-layered magnesium silicate composition is an effective sulfur oxide sorbent, it does not have to be used with feedstocks which contain high concentrations of sulfur as long as they contain high levels of metals. Thus, the scavenging composition of the invention may be used, and frequently will be used, with feedstocks that contain less than about 0.20 weight percent sulfur, calculated as the element, even less than 0.10 weight percent.

The nature and objects of the invention are further illustrated by the following examples, which are provided for illustrative purposes only and not to limit the invention as defined by the claims. Examples 1 through 5 describe the preparation of five embodiments of the metals scavenging composition of the invention. Examples 6 through 8 illustrate that the compositions of Examples 1 through 5 are effective vanadium scavengers.

EXAMPLE 1

A metals scavenging composition of the invention comprising lanthanum and the layered magnesium silicate known as sepiolite was prepared by impregnating 100 grams of sepiolite granules having a particle size between 100 and 325 mesh on the U.S. Sieve Series Scale with a sufficient amount of a 1.0 normal aqueous solution of lanthanum nitrate, $La(NO_3)_3$, such that the sepiolite granules contained approximately 2.5 weight percent lanthanum oxide, $La_2O_3$, after calcination. Prior to the impregnation, the sepiolite granules were calcined in air in an oven at 572° F. for 10 hours. After the granules were impregnated with the lanthanum nitrate solution, they were dried at 248° F. for 10 hours and then calcined in air at 572° F. for 10 hours. The sepiolite used to prepare the scavenger was obtained from TOLSA, S.A., as a relatively pure sepiolite essentially free of phase impurities. The sepiolite had a surface area of 142 m²/gram, a pore volume of 0.68 cubic centimeter per gram and contained 64.4 weight percent $SiO_2$, 27.8 weight percent MgO, 1.4 weight percent $Al_2O_3$, 0.41 weight percent $Fe_2O_3$, 0.14 weight percent CaO, and 0.10 weight percent $Na_2O$.

EXAMPLE 2

Another metals scavenging composition was prepared as described in Example 1 except 100 grams of sepiolite were impregnated with a 1.0 normal solution of ammonium cerium nitrate, $(NH_4)_2Ce(NO_3)_6$. The sepiolite granules after calcination at 572° F. for 10 hours contained 2.5 weight percent cerium oxide, $Ce_2O_3$.

EXAMPLE 3

Another metals scavenging composition was prepared utilizing the rare earth ore bastnaesite as the source of rare earth components. Seventy grams from the same sample of sepiolite used to prepare the scavenging composition of Example 1 was mixed with 30 grams of powdered bastnaesite having a particle size less than 325 mesh on the U.S. Sieve Series Scale. The bastnaesite, which was obtained from Molycorp, Inc., contained about 80 weight percent rare earths, calculated as the sum of the respective rare earth oxides, and about 5.0 weight percent fluorine. The mixture of sepiolite and bastnaesite was saturated with distilled water and mixed to the consistency of a cake. The cake was allowed to air dry and was then formed into wafers or discs by pressing portions of the cake on a 13 millimeter diameter die for one minute at about 10,000 lbs. The resultant wafers were crushed and sized into particles ranging between 100 and 325 mesh on the U.S. Sieve Series Scale. These particles were then dried at 212° F. for 10 hours and calcined in air at about 932° F. for 1 hour. The calcined particles contained 30 weight percent bastnaesite.

EXAMPLE 4

Another metals scavenger was prepared by the procedure described in Example 3 except the sepiolite used was in the form of a low grade ore obtained from Industrial Mineral Ventures (IMV) Company. This ore contained only between 50 and 60 weight percent of the pure sepiolite used to prepare the metals scavengers of Examples 1 through 3. In addition to sepiolite the mineral ore contained calcite, dolomite and quartz as major phase impurities.

EXAMPLE 5

Another metals scavenger was prepared as described in Example 3 except that the layered magnesium silicate known as attapulgite was used instead of sepiolite. The attapulgite, which was supplied by TOLSA, S.A., contained 60.1 weight percent $SiO_2$, 10.1 weight percent $Al_2O_3$, 7.8 weight percent MgO, 1.6 weight percent CaO, 1.8 weight percent $Fe_2O_3$, 0.4 weight percent $TiO_2$ and 0.48 weight percent $Na_2O$.

EXAMPLE 6

The compositions produced in accordance with the procedures of Examples 1 and 2 were tested for their effectiveness as metals scavengers during the catalytic cracking of a light gas oil. A fresh sample of GRZ-1 catalyst, a high activity cracking catalyst containing about 35 weight percent of a rare earth exchanged Y-type zeolite, was obtained from the Davison Chemical Division of W. R. Grace & Co. A portion of this sample was impregnated with vanadium by pore saturating the catalyst with a solution containing vanadyl naphthanate dissolved in benzene. The wet catalyst was then dried at 200° F. for 10 hours and calcined in air at 1004° F. for 10 hours. A sufficient amount of the vanadyl naphthanate solution was used such that the catalyst contained 1 weight percent or 10,000 ppmw vanadium, calculated as the element. Another portion of the fresh GRZ-1 catalyst was mixed with the sepiolite utilized to prepare the compositions of Examples 1 through 3 in a 3-to-2 weight ratio of catalyst to scavenger. This mixture was then impregnated with 1 weight percent vanadium by pore saturating the mixture of particles with a solution of vanadyl naphthanate dissolved in benzene and drying and calcining as discussed above. Finally, mixtures of fresh GRZ-1 catalyst and the metal scavengers of Examples 1 and 2 were prepared in a 3-to-2 weight ratio of catalyst to scavenger and loaded with 1 weight percent vanadium as described previously. The fresh GRZ-1 catalyst, the vanadium impregnated GRZ-1 catalyst, the impregnated mixture of GRZ-1 catalyst and sepiolite, and the vanadium impregnated mixtures of GRZ-1 catalyst and the Examples 1 and 2 metals scavengers were deactivated for testing by treatment in 100 percent flowing steam at 1400° F. for five hours and evaluated for cracking activity by use of the standard microactivity test method (MAT). The light gas oil feedstock used in the MAT tests had an API gravity of 29.6° and contained about 62.7 volume percent slurry or decant oil, i.e., material boiling above about 660° F., 33.1 volume percent light cycle gas oil, i.e., material boiling between about 425° F. and 660° F., and 4.2 volume percent gasoline, i.e., material boiling between about 50° F. and 425° F. The MAT tests were carried out at atmospheric pressure and at a temperature of 950° F. utilizing a weight hourly space velocity of between 13 and 14 reciprocal hours and a catalyst-to-oil ratio between 3.5 and 3.8. The feedstock contained 0.2 weight percent sulfur, 0.017 weight percent nitrogen and 23.1 weight percent aromatics. The results of these tests are set forth below in Table 1.

TABLE 1

|  | GRZ-1 | GRZ-1 | GRZ-1 + 40 wt % Sepiolite | GRZ-1 + 40 wt % of | |
|---|---|---|---|---|---|
|  |  |  |  | Example 1 Scavenger | Example 2 Scavenger |
| Vanadium loading (ppmw) | none | 10,000 | 10,000 | 10,000 | 10,000 |
| Conversion (vol %) | 92.3 | 38.9 | 74.7 | 80.8 | 82.5 |
| Gasoline (vol %) | 64.0 | 27.9 | 51.2 | 57.7 | 57.1 |
| LCGO* (vol %) | 5.4 | 30.6 | 16.1 | 13.3 | 12.1 |
| SO** (vol %) | 2.3 | 30.5 | 9.2 | 5.9 | 5.4 |
| Hydrogen (scf/b) | 61 | 213 | 263 | 313 | 339 |
| Coke (wt %) | 7.1 | 2.1 | 4.5 | 5.3 | 5.2 |

*Light cycle gas oil
**Slurry oil

As can be seen from the data in Table 1, the fresh GRZ-1 catalyst containing no vanadium exhibited high activity and selectivity as indicated by a 92.3 volume percent conversion and a 64.0 volume percent yield of gasoline, respectively. However, when this catalyst was contaminated with 10,000 ppmw vanadium, the conversion and gasoline yield dropped drastically to 38.9 and 27.9 volume percent respectively, thereby illustrating the deleterious effect of vanadium on catalyst activity and selectivity. The data also indicate that, when 40 weight percent of the GRZ-1 catalyst was replaced with the metal scavengers of Example 1 (sepiolite loaded with 2.5 weight percent $La_2O_3$) and Example 2 (sepiolite loaded with 2.5 weight percent $Ce_2O_3$) and the resultant mixtures impregnated with vanadium, the conversion and gasoline yields significantly increased to values above 80 volume percent and 57 volume percent, respectively. Although the original activity of the fresh catalyst could not be achieved, the use of the metals scavengers of Examples 1 and 2 significantly restored the activity and selectivity of the catalyst to useful levels.

A comparison of the above-discussed data with the conversion and gasoline yield obtained using a mixture of GRZ-1 catalyst and sepiolite containing no rare earth components indicates that the use of rare earth components in combination with the sepiolite considerably increases conversion and gasoline yield. These data show that the addition of as little as 2.5 weight percent lanthanum oxide or 2.5 weight percent cerium oxide to the sepiolite significantly increased conversion from 74.7 volume percent to 80.8 and 82.5 volume percent, respectively. Likewise, gasoline yields increased from 51.2 volume percent to 57.7 and 57.1 volume percent, respectively.

EXAMPLE 7

The metals scavenging compositions prepared as described in Examples 3, 4 and 5 were evaluated for their effectiveness during the catalytic cracking of metals-containing feedstocks in the same manner as described above in Example 6. The standard microactivity tests were utilized employing the same feedstock described in Example 6 under the same conditions. The mixtures of GRZ-1 catalyst and the metals scavengers were loaded with vanadium in the same manner as described in Example 6. In addition, a mixture of 60 weight percent GRZ-1 catalyst and 40 weight percent powdered bastnaesite ranging in size between 100 mesh and 325 mesh on the U.S. Sieve Series Scale was prepared, loaded with 1 weight percent vanadium and tested with the other mixtures. The results of these tests are set forth below in Table 2.

TABLE 2

|  | GRZ-1 | GRZ-1 + 40 wt % Sepiolite | GRZ-1 + 40 wt % Bastnaesite | GRZ-1 + 40 wt % of | | |
|---|---|---|---|---|---|---|
|  |  |  |  | Example 3 Scavenger | Example 4 Scavenger | Example 5 Scavenger |
| Vanadium loading (ppmw) | 10,000 | 10,000 | 10,000 | 10,000 | 10,000 | 10,000 |
| Conversion (vol %) | 38.9 | 74.7 | 67 | 81.4 | 71.3 | 70.3 |
| Gasoline (vol %) | 27.9 | 51.2 | 49.8 | 60.2 | 53.5 | 53.2 |
| LCGO* (vol %) | 30.6 | 16.1 | 20.2 | 13.1 | 18.3 | 18.7 |
| SO** (vol %) | 30.5 | 9.2 | 12.9 | 5.4 | 10.4 | 11.0 |
| Hydrogen (scf/b) | 213 | 263 | 87 | 230 | 133 | 200 |
| Coke (wt %) | 2.1 | 4.5 | 2.6 | 4.4 | 2.5 | 3.1 |

*Light cycle gas oil
**Slurry oil

As can be seen from Table 2, replacing 40 weight percent of the GRZ-1 catalyst with the scavengers of Examples 3, 4 and 5 resulted in increasing conversion from 38.9 volume percent to 81.4, 71.3 and 70.3 volume percent, respectively. The gasoline yields obtained with the combinations of GRZ-1 catalyst and the three metals scavengers were also drastically higher than that obtained with GRZ-1 itself. The Example 3 scavenger, which contained pure sepiolite and 30 weight percent bastnaesite, was significantly more active and selective than the Example 4 scavenger, which contained an impure form of sepiolite and 30 weight percent bastnaesite, and the Example 5 scavenger, which was comprised of attapulgite and 30 weight percent bastnaesite.

The data in Table 2 also show that the use of the metals scavengers of Examples 3, 4 and 5, which contain bastnaesite in addition to sepiolite, significantly improves on the coke selectivity obtained when sepiolite is used alone. The use of the Example 3 scavenger resulted in only a 4.4 weight percent coke yield at an 81.4 volume percent conversion as compared to a 4.5 weight percent coke yield obtained with sepiolite alone at the much lower conversion of 74.7 volume percent. Moreover, the Examples 4 and 5 scavengers exhibited much lower coke yields, i.e., 2.5 and 3.1 weight percent, respectively, than the 4.5 weight percent obtained with sepiolite alone at similar conversion levels.

A comparison of the conversion data obtained using the mixture of GRZ-1 catalyst and the Example 3 scavenger with the data obtained using (1) the mixture of GRZ-1 catalyst and 40 weight percent pure sepiolite and (2) the mixture of GRZ-1 catalyst and 40 weight percent bastnaesite reveals an unexpected result. The use of the mixture containing pure sepiolite yielded a 74.7 volume percent conversion whereas the use of the mixture containing bastnaesite yielded a 67 volume percent conversion. The use of the mixture containing the Example 3 scavenger, which comprised a mixture of pure sepiolite and bastnaesite, on the other hand, yielded an 81.4 volume percent conversion—a conversion which is much higher than that which would have been expected if bastnaesite and sepiolite were making equal contributions to the increase in conversion. Assuming equal amounts of sepiolite and bastnaesite were used in the scavenger, a conversion halfway between 67 and 74.7 volume percent would be expected. Surprisingly, however, an 81.4 volume percent conversion was obtained using only 30 weight percent—not 50 weight percent -bastnaesite in the scavenger. Such a result is clearly unexpected.

EXAMPLE 8

The metals scavenging composition of Example 1 was evaluated for its effectiveness in cracking heavy gas oils containing relatively large concentrations of organosulfur compounds and aromatics. The procedure of Example 6 was followed except that a heavy gas oil having an API gravity of 23.7, a sulfur content of 1.26 weight percent, an aromatics concentration of 34.1 weight percent and a nitrogen concentration of 0.255 weight percent was used in the MAT tests in lieu of the low sulfur and lighter feedstock employed in Example 6. The results of these tests are set forth below in Table 3.

TABLE 3

|  | GRZ-1 | GRZ-1 | GRZ-1 + 40 wt % Sepiolite | GRZ-1 + 40 wt % of Example 1 Scavenger |
|---|---|---|---|---|
| Vanadium loading (ppmw) | none | 10,000 | 10,000 | 10,000 |
| Conversion (vol %) | 86.6 | 23.5 | 55.1 | 63.8 |
| Gasoline (vol %) | 57.9 | 15.3 | 36.7 | 45.6 |
| LCGO* (vol %) | 8.7 | 27.1 | 23.1 | 18.5 |
| SO** (vol %) | 4.8 | 49.4 | 21.9 | 17.7 |
| Hydrogen (scf/b) | 54 | 172 | 415 | 296 |
| Coke (wt %) | 9.8 | 2.8 | 6.6 | 2.6 |

*Light cycle gas oil
**Slurry oil

As can be seen from the data in Table 3, the activity and gasoline selectivity of the GRZ-1 catalyst dramatically fell from 86.6 and 57.9 volume percent, respectively, to 23.5 and 15.3 volume percent when contaminated with 10,000 ppmw vanadium. This same trend was observed in Example 6 with the use of a lighter feedstock. The data in Table 3 also indicate that, when 40 weight percent of the GRZ-1 catalyst was replaced with the metal scavenger of Example 1 (sepiolite loaded with 2.5 weight percent $La_2O_3$) and the mixture impregnated with vanadium, the conversion and gasoline yields significantly increased to 63.8 volume percent and 45.6 volume percent, respectively. Although the original activity of the fresh catalyst could not be achieved, the use of the Example 1 metal scavenger restored the activity and selectivity of the catalyst to useful levels. In addition, the use of the metal scavenger resulted in an extremely low coke make of 2.6 weight percent and a low hydrogen make of 296 scf/b.

A comparison of the above-discussed data with the conversion and gasoline yield obtained using a mixture of GRZ-1 catalyst and sepiolite containing no rare earth components indicates that the use of rare earth components in combination with the sepiolite considerably increased conversion and gasoline yield as well as coke selectivity. These data show that the addition of 2.5 weight percent lanthanum oxide to the sepiolite increased conversion and gasoline yield from 55.1 volume percent and 36.7 volume percent, respectively, to 63.8 and 45.6 volume percent while decreasing coke selectivity from 6.6 to 2.6 weight percent even though conversion increased.

It will be apparent from the foregoing that the invention provides a metals scavenging composition which can be used in processes for the catalytic cracking of metals contaminated feedstocks to prevent significant decreases in catalyst activity and selectivity. The metals tolerance of the catalyst results in longer run times between catalyst changeovers and the need for less makeup catalyst. Also, since a portion of the cracking catalyst is replaced with a less expensive metals scavenger, total catalyst costs are reduced. These factors, in turn, result in lower cost operations.

Although this invention has been primarily described in conjunction with examples and by references to embodiments thereof, it is evident that many alternatives modifications and variations will be apparent to those skilled in the art in light of the foregoing description. Accordingly, it is intended to embrace within the invention all such alternatives, modifications and variations that fall within the spirit and scope of the appended claims.

I claim:

1. A process for the catalytic cracking of a metals-containing hydrocarbon feestock which comprises contacting said feedstock with a mixture of a cracking catalyst and separate particles of a metals scavenger under cracking conditions in the substantial absence of added molecular hydrogen in a cracking zone to convert components of said feedstock into lower molecular weight constituents, wherein said cracking catalyst comprises a molecular sieve having cracking activity dispersed in a matrix and said metals scavenger comprises between about 0.10 and 30 weight percent of one or more rare earth components, calculated as the sum of the respective rare earth oxides, and a layered magnesium silicate.

2. A process as defined by claim 1 wherein said hydrocarbon feedstock contains vanadium in a concentration greater than about 1.0 ppmw, calculated as the metal.

3. A process as defined by claim 2 wherein said hydrocarbon feedstock contains vanadium in a concentration greater than about 5.0 ppmw, calculated as the metal.

4. A process as defined by claim 1 wherein said mixture of cracking catalyst and metals scavenger contains between about 5000 and about 20,000 ppmw vanadium, calculated as the metal.

5. A process as defined by claim 1 wherein said molecular sieve is a zeolitic molecular sieve.

6. A process as defined by claim 5 wherein said zeolitic molecular sieve is a Y zeolite or a modified Y zeolite.

7. A process as defined by claim 1 wherein said metals scavenger comprises a lanthanum component.

8. A process as defined by claim 1 wherein said metals scavenger comprises a cerium component.

9. A process as defined by claim 1 wherein said metals scavenger comprises a mixture of rare earth components and a layered magnesium silicate.

10. A process as defined by claim 9 wherein said mixture of rare earth components comprises bastnaesite.

11. A process as defined by claim 9 wherein said mixture of rare earth components comprises monazite.

12. A process as defined by claim 1 wherein said layered magnesium silicate comprises sepiolite.

13. A process as defined by claim 1 wherein said layered magnesium silicate comprises chrysotile.

14. A process as defined by claim 1 wherein said layered magnesium silicate comprises saponite.

15. A process as defined by claim 1 wherein said layered magnesium silicate comprises hectorite.

16. A process as defined by claim 1 wherein said layered magnesium silicate comprises attapulgite.

17. A process as defined by claim 1 wherein said hydrocarbon feedstock contains less than about 0.20 weight percent sulfur.

18. A process for the catalytic cracking of a metals-containing hydrocarbon feedstock which comprises contacting said feedstock with a mixture of a cracking catalyst and separate particles of a metals scavenger under cracking conditions in the substantial absence of added molecular hydrogen in a cracking zone to convert components of said feedstock into lower molecular weight constituents, wherein said cracking catalyst comprises a molecular sieve having cracking activity dispersed in a matrix and said metals scavenger comprises between about 0.10 and 30 weight percent of one or more rare earth components, calculated as the sum of the respective rare earth oxides, and sepiolite.

19. A process as defined by claim 18 wherein said metals scavenger comprises lanthanum.

20. A process as defined by claim 18 wherein said metals scavenger comprises cerium.

21. A process as defined by claim 18 wherein said metals scavenger comprises a mixture of rare earth components and sepiolite.

22. A process as defined by claim 21 wherein said mixture of rare earth components comprises bastnaesite.

23. A process as defined by claim 21 wherein said mixture of rare earth components comprises monazite.

24. A process as defined by claim 17 wherein said hydrocarbon feedstock contains greater than about 4.0 ppmw nickel equivalents.

25. A process as defined by claim 9 wherein said metals scavenger is prepared by contacting said layered magnesium silicate with an aqueous solution containing a mixture of rare earth metal constituents derived from a rare earth ore.

26. A process as defined by claim 21 wherein said metals scavenger is prepared by contacting said sepiolite with an aqueous solution containing a mixture of rare earth metal constituents derived from a rare earth ore.

27. A process is defined by claim 25 wherein said rare earth ore comprises bastnaesite or monazite.

28. A process as defined by claim 26 wherein said rare earth ore comprises bastnaesite or monazite.

* * * * *